(12) United States Patent
Topal et al.

(10) Patent No.: US 11,416,078 B2
(45) Date of Patent: Aug. 16, 2022

(54) METHOD, SYSTEM AND COMPUTER PROGRAM FOR REMOTELY CONTROLLING A DISPLAY DEVICE VIA HEAD GESTURES

(71) Applicant: Vestel Elektronik Sanayi ve Ticaret A.S., Manisa (TR)

(72) Inventors: Cihan Topal, Manisa (TR); Barbaros Kirişken, Manisa (TR)

(73) Assignee: VESTEL ELEKTRONIK SANAYI VE TICARET A.S., Manisa (TR)

( * ) Notice: Subject to any disclaimer, the term of this patent is extended or adjusted under 35 U.S.C. 154(b) by 0 days.

(21) Appl. No.: 17/057,043

(22) PCT Filed: Jul. 31, 2018

(86) PCT No.: PCT/EP2018/070797
§ 371 (c)(1),
(2) Date: Nov. 19, 2020

(87) PCT Pub. No.: WO2019/223889
PCT Pub. Date: Nov. 28, 2019

(65) Prior Publication Data
US 2021/0311556 A1    Oct. 7, 2021

(30) Foreign Application Priority Data

May 21, 2018 (EP) .................................. 18173425

(51) Int. Cl.
*G06F 3/01* (2006.01)
*H04N 13/275* (2018.01)
(Continued)

(52) U.S. Cl.
CPC .............. *G06F 3/017* (2013.01); *G06F 3/012* (2013.01); *G06V 40/169* (2022.01); *G06V 40/20* (2022.01); *H04N 13/275* (2018.05)

(58) Field of Classification Search
CPC .......... G06F 3/012; G06F 3/017; G06F 3/038; G06K 9/00268; G06K 9/00275; G06K 9/00335; H04N 13/275
See application file for complete search history.

(56) References Cited

U.S. PATENT DOCUMENTS 8,160,311 B1   4/2012   Schaefer
9,317,175 B1   4/2016   Lockhart
(Continued)

FOREIGN PATENT DOCUMENTS

WO   2008/073801 A2   6/2008
WO   2015/195652 A1   12/2015

OTHER PUBLICATIONS

Ahonen, Timo, et al., "Face Recognition with Local Binary Patterns," T. Pajdla and J. Matas (Eds.): ECCV 2004, LNCS 3021, pp. 469-481, 2004, Springer-Verlag Berlin Heidelberg 2004 (13 pages).
(Continued)

*Primary Examiner* — Nelson M Rosario
(74) *Attorney, Agent, or Firm* — Brandon V. Zuniga; James R. Gourley; Carstens & Cahoon, LLP

(57) ABSTRACT

A method for remotely controlling a computing device comprises repeatedly capturing an image from a video frame, detecting a human face in the captured image, matching the detected human face to a previously detected human face, extracting facial landmarks from the matched detected human face, estimating a 3D head pose of the matched detected human face based on the extracted facial landmarks, the 3D head pose being represented in an egocentric coordinate system by a 3D pose vector which is directed from the human face, the 3D pose vector being free to rotate around x-, y- and z-axes of the egocentric coordinate system using respective rotation matrices and free to translate along these x-, y- and z-axes using a translation
(Continued)

vector, and controlling a user interface on a display screen of the computing device according to the estimated 3D head pose.

9 Claims, 4 Drawing Sheets

(51) Int. Cl.
    *G06V 40/20*     (2022.01)
    *G06V 40/16*     (2022.01)

(56) References Cited

U.S. PATENT DOCUMENTS

| | | | |
|---|---|---|---|
| 9,465,990 B2* | 10/2016 | Ronnecke | G06K 9/2054 |
| 2009/0217211 A1 | 8/2009 | Hildreth | |
| 2010/0125815 A1 | 5/2010 | Wang | |
| 2012/0169887 A1 | 7/2012 | Zhu | |
| 2012/0200494 A1 | 8/2012 | Perski | |
| 2012/0229377 A1 | 9/2012 | Kim | |
| 2013/0304479 A1 | 11/2013 | Teller | |
| 2015/0116206 A1 | 4/2015 | Irie | |
| 2015/0192991 A1 | 7/2015 | Dal Mutto | |
| 2016/0148434 A1* | 5/2016 | Blonde | H04N 13/279 |
| | | | 345/633 |
| 2017/0160797 A1 | 6/2017 | Mora | |

OTHER PUBLICATIONS

Viola, Paul, et al., "Robust Real-Time Face Detection," International J. of Computer Vision 57(2), 137-154, 2004, 2004 Kluwer Academic Publishers, Manufactured in The Netherlands (18 pages).

* cited by examiner

METHOD, SYSTEM AND COMPUTER PROGRAM FOR REMOTELY CONTROLLING A DISPLAY DEVICE VIA HEAD GESTURES

CROSS REFERENCE TO RELATED APPLICATION

This application is a US 371 application from PCT/EP2018/070797 entitled "Method, System and Computer Program for Remotely Controlling a Display Device via Head Gestures" filed on Jul. 31, 2018 and published as WO 2019/223889 A1 on Nov. 28, 2019, which claims priority to EP Application 18173425.2 filed on May 21, 2018. The technical disclosures of every application and publication listed in this paragraph are hereby incorporated herein by reference.

TECHNICAL FIELD

The present disclosure relates to a human-computer interaction and, in particular but without limitation, to a method, system and computer program for remotely controlling a display device via head gestures.

BACKGROUND

Gesture-based solutions develop to allow for display device control through human-computer interaction in a more natural manner.

Most of these non-verbal solutions are based on hand gestures that require to have the user's hands free, which may however be binding in the case of a user having disabilities that prevent him/her from moving his/her arms, hands and/or fingers.

From an ergonomics standpoint, to perform selections on an interactive screen of a display device via hand gestures usually requires that the user moves his/her hand in vertical and horizontal directions. However, the limited range of hand motion may impede the user to reach every location on the screen, so that static menus appear only at some specific locations on the screen in order to ensure that the user can perform his/her selection by moving his/her hand towards the corresponding menu buttons. Movement of the hands can also be restricted in some environments, in, for example, public places, especially crowded public places such as airports, railway stations, shopping centres, etc.

Thus, it becomes challenging to propose an alternative human-computer interaction that allows a user to access every location on the entire screen for the control of a display device.

SUMMARY

According to a first aspect disclosed herein, there may be provided a method for remotely controlling a computing device. The method may comprise repeatedly capturing an image from a video frame, detecting a human face in the captured image, matching the detected human face to a previously detected human face, extracting facial landmarks from the matched detected human face, estimating a three-dimensional (3D) head pose of the matched detected human face based on the extracted facial landmarks, the 3D head pose being represented in an egocentric coordinate system by a 3D pose vector which is directed from the human face, the 3D head pose being free to rotate around x-, y- and z-axes of the egocentric coordinate system using respective rotation matrices and free to translate along the x-, y- and z-axes of the egocentric coordinate system using a translation vector, and controlling a user interface (UI) on a display screen of the computing device according to the estimated 3D head pose.

In an example of the first aspect, controlling the user interface on the display screen of the computing device may comprise mapping a cursor on the display screen of the computing device to the estimated 3D head pose.

In an example of the first aspect, mapping the cursor on the display screen of the computing device to the estimated 3D head pose may comprise converting the 3D pose vector in the egocentric coordinate system to a 2D pose vector in a coordinate system of a 2D plane of the display screen.

In an example of the first aspect, converting the 3D pose vector in the egocentric coordinate system to a 2D pose vector in a coordinate system of the 2D plane of the display screen (170) may comprise projecting the 3D head pose vector axes of the egocentric coordinate system onto the 2D plane of the display screen and applying a 3D-to-2D mapping function that utilizes rotation-based information.

In an example of the first aspect, the rotation-based information may be orientation information about pitch and yaw angles.

In an example of the first aspect, the coordinates ($x_{screen}$, $y_{screen}$) of the 2D pose vector in the coordinate system of the display screen may be expressed in pixels and may be given, after applying the 3D-to-2D mapping function, by:

$$x_{screen}(\text{pixel}) = \frac{W}{2} + \left(\frac{x_z - x_0}{|x_x - x_0|} \times \frac{W \times f_x}{2}\right)$$

$$y_{screen}(\text{pixel}) = \frac{H}{2} + \left(\frac{y_z - y_0}{|y_y - y_0|} \times \frac{H \times f_y}{2}\right)$$

where:

W denotes the width (in pixels) of the display screen;

H denotes the height (in pixels) of the display screen;

$f_x$ denotes a replacement factor along the x-axis of the coordinate system of the display screen;

$f_y$ denotes a replacement factor along the y-axis of the coordinate system of the display screen;

($x_0$, $y_0$) denotes the coordinates of the origin in the coordinate system of the display screen after converting the coordinates of the origin of the egocentric coordinate system;

($x_z$, $y_z$) denotes the coordinates of the z-axis component of the 2D pose vector in the coordinate system of the display screen after converting the z-axis component of the 3D pose vector in the egocentric coordinate system;

$x_x$ denotes the abscissa of the x-axis component of the 2D pose vector in the coordinate system of the display screen after converting the x-axis component of the 3D pose vector in the egocentric coordinate system; and $y_y$ denotes the ordinate of the y-axis component of the 2D pose vector in the coordinate system of the display screen after converting the y-axis component of the 3D pose vector in the egocentric coordinate system.

In an example of the first aspect, the extracted facial landmarks may be used as a match to a generic 3D face model.

In an example of the first aspect, the image may be repeatedly captured from the video frame using at least one image capturing device.

According to a second aspect disclosed herein, there may be provided an interactive system comprising at least one image capturing device arranged to repeatedly capture an image from a video frame and a computing device. The computing device may comprise a display screen and a processor. The processor may be arranged to detect a human face in the captured image, match the detected human face to a previously detected human face, extract facial landmarks from the matched detected human face, estimate a three-dimensional (3D) head pose of the matched detected human face based on the extracted facial landmarks, the 3D head pose being represented in an egocentric coordinate system by a 3D pose vector which is directed from the human face, the 3D pose vector being free to rotate around x-, y- and z-axes of the egocentric coordinate system using respective rotation matrices and free to translate along the x-, y- and z-axes of the egocentric coordinate system using a translation vector, and control a user interface on a display screen of the computing device according to the estimated 3D head pose.

In an example of the second aspect, the interactive system may be arranged such that controlling the user interface on the display screen may comprise mapping a cursor on the display screen of the computing device to the estimated 3D head pose.

In an example of the second aspect, the computing device may comprise a storage unit arranged to store the matched detected human face.

In an example of the second aspect, the at least one image capturing device may be embodied in the computing device.

In an example of the second aspect, the interactive system may be arranged such that the cursor may be free to move on the display screen.

According to a third aspect disclosed herein, there may be provided a computer program product comprising program instructions such that, when the computer program is executed on a device, the computing device is arranged to carry out a method according to any of the first aspect and examples of the first aspect.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

The motion or gesture of a human head may consist of a rotation and a translation, such that six degrees of freedom (DOF) may be required to determine in a three-dimensional (3D) space a human head pose specified by the position and orientation of the human head with respect to a reference object (e.g., a camera). Thus, the position of the human head may refer to an amount of displacement along x-, y- and z-axes and be described by a 3×1 translation vector denoted by "t", while the orientation of the human head may refer to an amount of rotation and be described in an egocentric coordinate system (i.e., an object coordinate frame with the human head referring to as the object) by three Euler angles, also known as pitch, yaw and roll angles. Pitch refers to nodding motion (i.e., head moving upwards or downwards) and may be defined as the rotation by an amount of angle around the horizontal axis (i.e., x-axis) of the egocentric coordinate system, this rotation being encoded as a single pitch-based 3×3 rotation matrix. Yaw refers to shaking motion (i.e., head moving towards the left or the right without tilting) and may be defined as the rotation by an amount of angle around the vertical axis (i.e., y-axis) of the egocentric coordinate system, this rotation being encoded as a single yaw-based 3×3 rotation matrix. Roll refers to tilting motion (i.e., head tilting towards the left or the right) and may be defined as the rotation by an amount of angle around the axis perpendicular to two previous axes of the egocentric coordinate system (i.e., z-axis), this rotation being encoded as a single roll-based 3×3 rotation matrix. The pitch-, yaw- and roll-based rotations may thus be used to place a 3D body like the human head in any orientation, the combined 3×3 rotation matrix denoted by "R" being obtained by multiplying the pitch-, yaw- and roll-based 3×3 rotation matrices together. Finally, the human head pose is a 3D head pose, which may be described by a 3×4 matrix "[R|t]" whose left three columns are formed by the combined 3×3 rotation matrix R and right-most column is formed by the 3×1 translation vector t.

Figure 1:
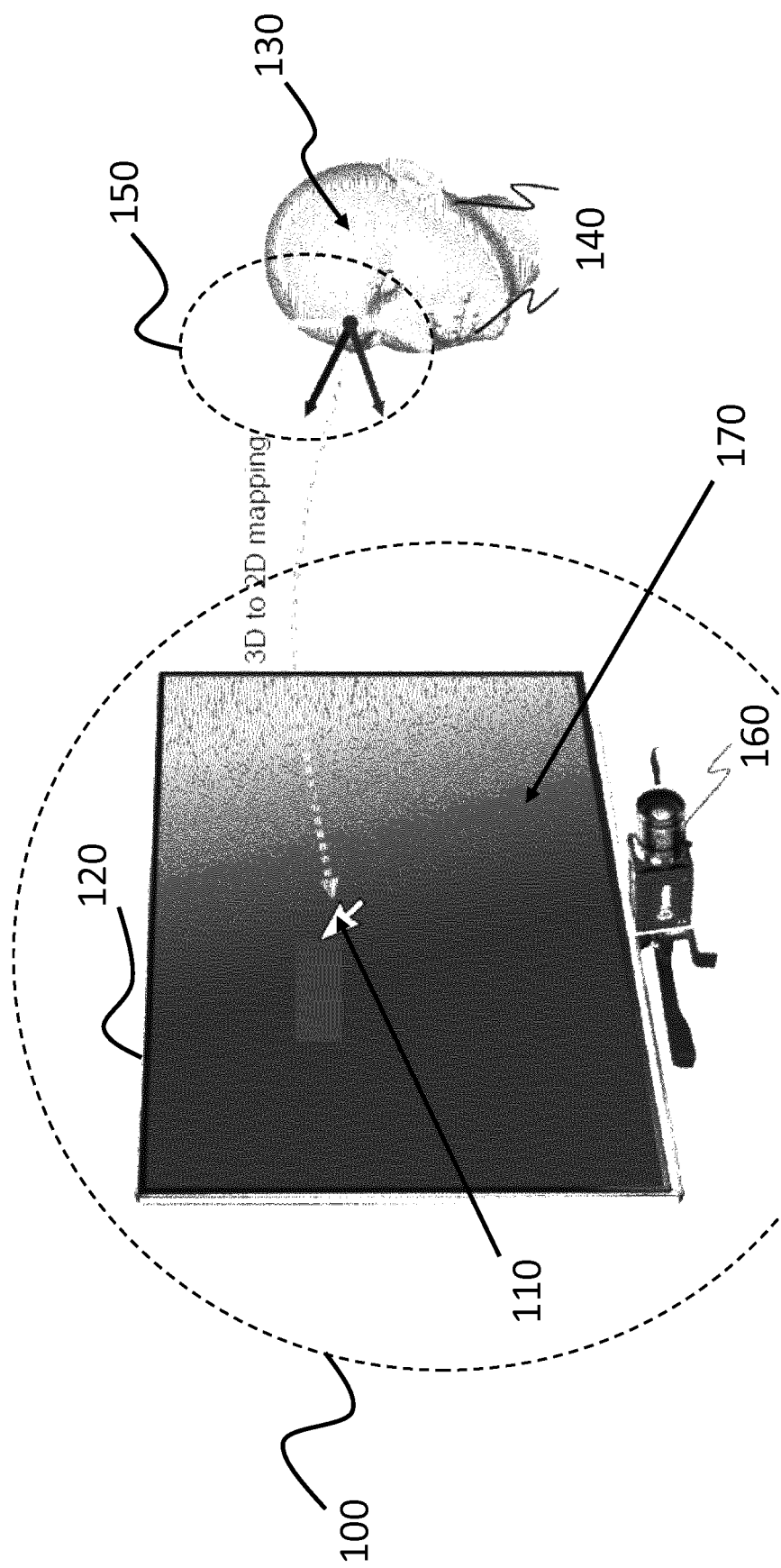
FIG. 1 shows schematically an example of an arrangement to perform a real-time mapping between a cursor of a computing device and an estimated 3D head pose of a user according to the present disclosure.

FIG. 1 shows schematically an example of an arrangement to perform a real-time mapping (in particular a 3D-to-2D mapping) between a cursor 110 of a computing device 120 and an estimated 3D head pose of a user 130 according to the present disclosure. The arrangement may comprise an interactive system 100 and the user 130. The latter 130 is depicted by his/her head or face on which facial landmarks 140 (e.g., facial landmark points) are located and on which a 3D pose vector corresponding to the estimated 3D head pose is represented in the egocentric coordinate system 150. In the example of FIG. 1, the interactive system 100 may comprise the computing device 120 and at least one image capturing device 160 (e.g., a digital camera having a colour or grayscale sensor with a proper lens, a RGB and/or infrared digital camera, etc.) connected to an input of the computing device 120. In another example, the at least one image capturing device 160 may be embodied in the computing device 120 so as to merge together into a single unit. As depicted, the computing device 120 may comprise a display screen 170 on which the cursor 110 may freely move. The display screen 170 may be arranged with a user interface (UI) (e.g., a graphical user interface (GUI)), and the cursor 110 may interact with graphical elements/icons or interface objects of the UI on the display screen 170. More generally, the computing device 120 with the display screen 170 may include any display device with a screen display such as, but not limited to, consumer electronics (e.g., television set, media player, game console, etc.), digital signage, tablets, smartphones and digital billboards.

Figure 2:
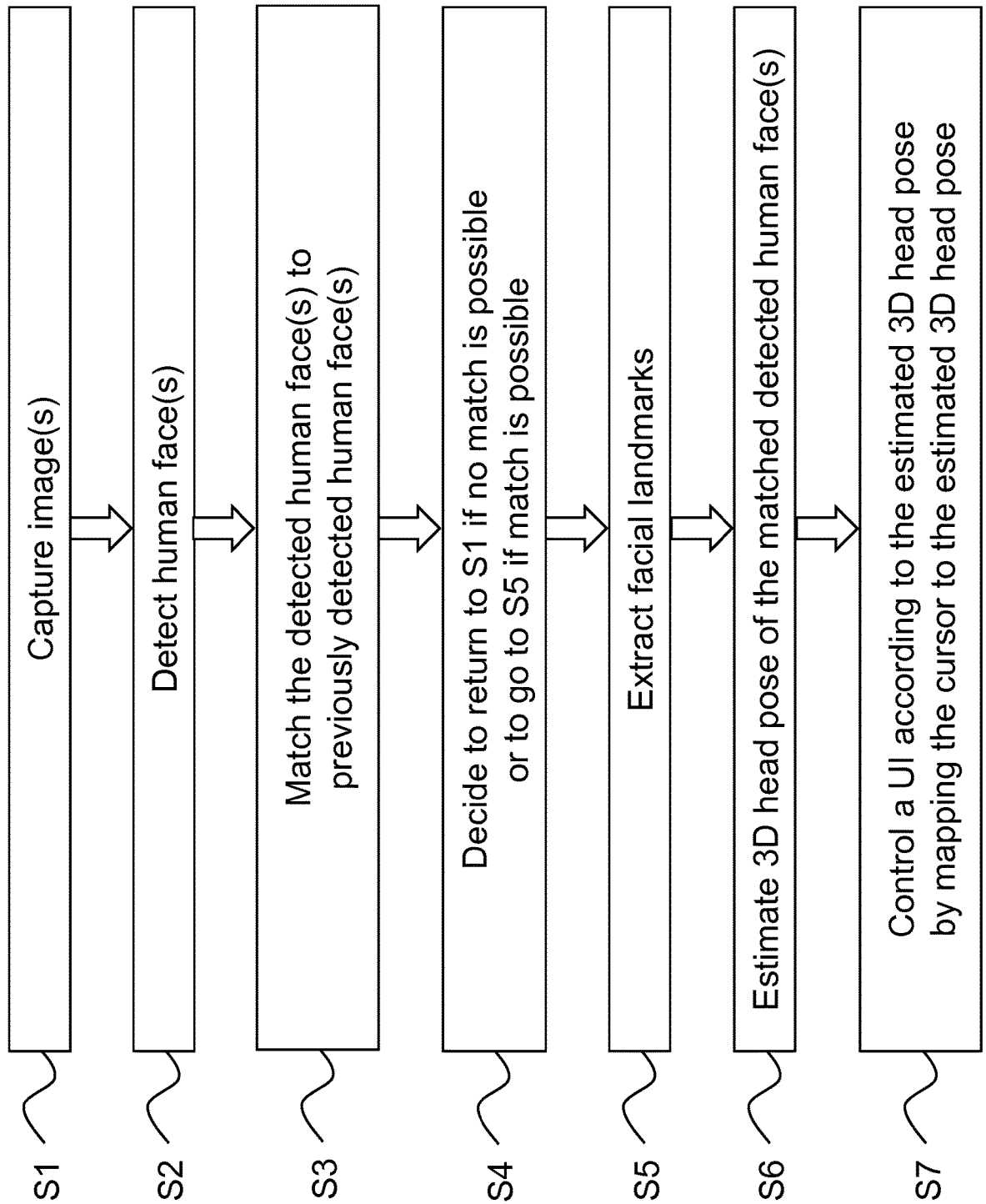
FIG. 2 shows schematically an example of a flow chart illustrating a process for remotely controlling the computing device using a real-time mapping between the cursor and the estimated 3D head pose of the user according to the present disclosure.

FIG. 2 shows schematically an example of a flow chart illustrating a process for remotely controlling the computing device 120 using a real-time mapping between the cursor 110 and the estimated 3D head pose of the user 130 according to the present disclosure. The process will be described in the following in connection with the arrangement of FIG. 1.

In S1, the at least one image capturing device 160 may be arranged to repeatedly capture an image from a video frame and to provide the captured image to a processor or computation unit of the computing device 120.

In S2, the processor or computation unit may be arranged to detect a human face in the captured image using, for example, face detection algorithms and face bounding rectangles/boxes as found, in particular but without limitation, in: Viola P. and Jones M. J., "Robust Real-Time Face Detection", International Journal of Computer Vision, vol. 57, issue 2, pp. 137-154, May 2004, which minimizes computation time while achieving high detection accuracy through the use of a so-called integral image in a first approach, a simple and efficient classifier in a second approach and a cascade of classifiers in a third approach.

In S3, the processor or computation unit may be arranged to match the detected human face to a previously detected human face stored in a storage unit (e.g., a memory) of the computing device 120 using, for example, face recognition algorithms. Indeed, as the matching of the detected human face is to be performed for each consecutive video frame, any appropriate fast and efficient face recognition algorithm may be used, as found, in particular but without limitation, in: Ahonen T., Hadid A. and Pietikainen M., "Face Recognition with Local Binary patterns", 8$^{th}$ European Conference on Computer Vision (ECCV) in Prague (CZE), pp. 469-481, May 2004, which discloses a simple face recognition method allowing for very fast feature extraction. In an example, the detected human face may be matched by merely comparing the spatial coordinates of the human faces, without applying any other recognition task.

In S4, the processor or computation unit may be arranged to make the decision to return to S1 if there is no match, i.e., if no detected human face can be identified or tracked, or to go to S5 if there is a match.

In S5, the processor or computation unit may be arranged to extract facial landmarks 140 from the matched detected human face using, for example, facial landmark extraction algorithms, and to use these extracted facial landmarks 140 as a match to a generic or average 3D face model.

In S6, the processor or computation unit may be arranged to estimate, based on the extracted facial landmarks 140 and the corresponding generic or average 3D face model, a 3D head pose of the detected human face being matched. The 3D head pose may be represented by a 3D pose vector, which is directed from the human face and is free to rotate by an amount of rotation (i.e., an amount of angle) around the virtual x-, y- and z-axes of the egocentric coordinate system 150 using the respective 3×3 rotation matrices and free to translate or move by an amount of displacement along those virtual x-, y- and z-axes using the 3×1 translation vector t. Thus, the orientation and the position of the human head may be considered in the estimation of the 3D head pose, so that the pitch-, yaw- and roll-based 3×3 rotation matrices and thereby the combined 3×3 rotation matrix R, and the 3×1 translation vector t are computed by the processor or computation unit to estimate the 3D head pose. It should be appreciated that multiple human faces may be detected in a same captured image. In the case where all these detected human faces can respectively match to a previously detected human face, then the head pose of each detected human face can be represented by a respective distinguishing 3D pose vector.

Figure 3:
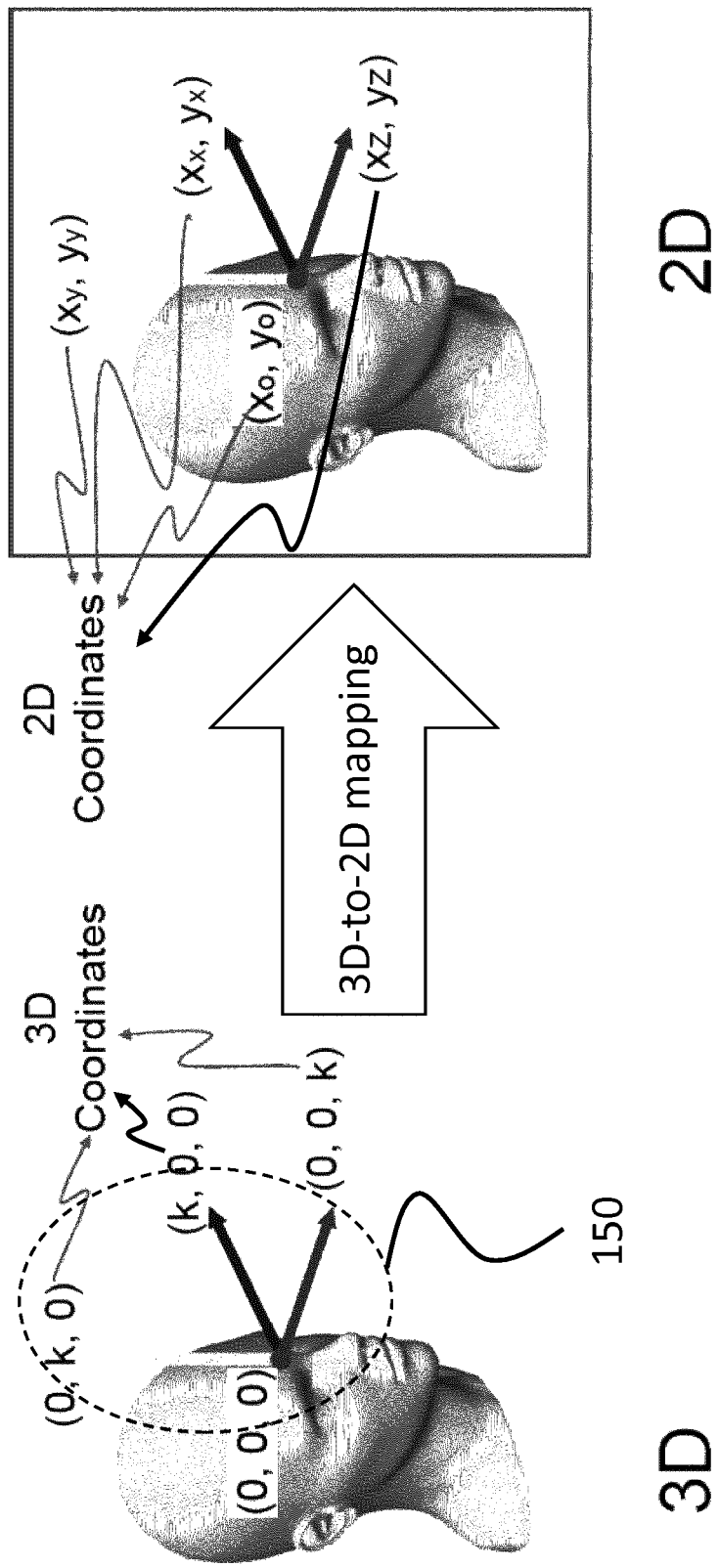
FIG. 3 shows schematically an example of a conversion of a 3D pose vector in an egocentric coordinate system to a 2D pose vector in a coordinate system of the display screen according to the present disclosure.

In S7, the processor or computation unit may be arranged to control the UI on the display screen 170 of the computing device 120 according to the estimated 3D head pose by mapping in real time the cursor 110 on the display screen 170 of the computing device 120 to the estimated 3D head pose. This mapping may comprise converting the 3D pose vector in the egocentric coordinate system 150 to a 2D pose vector in a coordinate system of a 2D plane of the display screen 170 by projecting the 3D head pose vector axes of the egocentric coordinate system 150 onto the 2D plane of the display screen 170 and by then applying a 3D-to-2D mapping function to compute and determine the cursor location. In an example, the 3D-to-2D mapping function utilizes orientation information about the pitch and yaw angles to determine the cursor location by computing the coordinates (i.e., the x- and y-values) of the 2D pose vector in the coordinate system of the display screen 170. As illustrated in FIG. 3, the coordinates ($x_{screen}$, $y_{screen}$) of the 2D pose vector in the coordinate system of the display screen 170 are expressed in pixels and may be given, after applying the 3D-to-2D mapping function, by:

$$x_{screen}(\text{pixel}) = \frac{W}{2} + \left( \frac{x_z - x_0}{|x_x - x_0|} \times \frac{W \times f_x}{2} \right) \quad (1)$$

$$y_{screen}(\text{pixel}) = \frac{H}{2} + \left( \frac{y_z - y_0}{|y_y - y_0|} \times \frac{H \times f_y}{2} \right) \quad (2)$$

where:
W denotes the width (in pixels) of the display screen 170;
H denotes the height (in pixels) of the display screen 170;
$f_x$ denotes a replacement factor along the x-axis of the coordinate system of the display screen 170;
$f_y$ denotes a replacement factor along the y-axis of the coordinate system of the display screen 170;
($x_0$, $y_0$) denotes the new coordinates of the origin in the coordinate system of the display screen 170 which have been obtained after converting the coordinates (0, 0, 0) of the origin of the egocentric coordinate system 150;
($x_z$, $y_z$) denotes the new coordinates of the z-axis component of the 2D pose vector in the coordinate system of the display screen 170 which have been obtained after converting the z-axis component of the 3D pose vector of coordinates (0, 0, k) in the egocentric coordinate system 150;
$x_x$ denotes the new abscissa of the x-axis component of the 2D pose vector in the coordinate system of the display screen 170 which has been obtained after converting the x-axis component of the 3D pose vector of coordinates (k, 0, 0) in the egocentric coordinate system 150, and
$y_y$ denotes the new ordinate of the y-axis component of the 2D pose vector in the coordinate system of the display screen 170 which has been obtained after converting the y-axis component of the 3D pose vector of coordinates (0, k, 0) in the egocentric coordinate system 150.

It should be appreciated that the replacement factor ($f_x$, $f_y$) works similarly to a coefficient that may control the displacement of the cursor 110 per unit of head movement, i.e., per degree. In other words, the displacement of the cursor 110 increases as the replacement factor ($f_x$, $f_y$) increases. It can be separately adjusted according to the horizontal (x-axis) and vertical (y-axis) directions. To compensate for the fact that the vertical angular span of a human head (i.e., a user's head) is narrower than the horizontal one, the replacement factor $f_y$ may be set to a higher value for movements in the vertical direction (y-axis) with respect to the replacement factor $f_x$ for movements in the horizontal direction (x-axis). Thereby, the replacement factors $f_x$ and $f_y$ may be used to synchronize the horizontal and vertical movements.

As above-mentioned, the position of the human head refers to an amount of displacement along the virtual x-, y- and z-axes of the egocentric coordinate system 150. Thus, it should be appreciated that the 3D head pose, which is specified in particular by its position, varies according to the relative locations of, i.e., according to the distance between, the user 130 and the at least one image capturing device 160. On the other hand, the determination of the cursor location using the 3D-to-2D mapping function has the advantage to provide the same user experience regardless of the user 130's location with respect to the location of the at least one image capturing device 160. Indeed, the 3D-to-2D mapping function does not utilize translation-based information to compute and determine the cursor location but utilizes rather rotation-based information, i.e., the orientation information about, in particular, the pitch and yaw angles. Thereby, the 3D-to-2D mapping function allows to cancel out the effect of changes of position of the user 130.

Moreover, it should be appreciated that the cursor location on the display screen 170 is not where the user points with his/her head. In other terms, the physical location of the cursor 110 is not where the direction of the head intersects the display screen 170 of the computing device 120.

Figure 4:
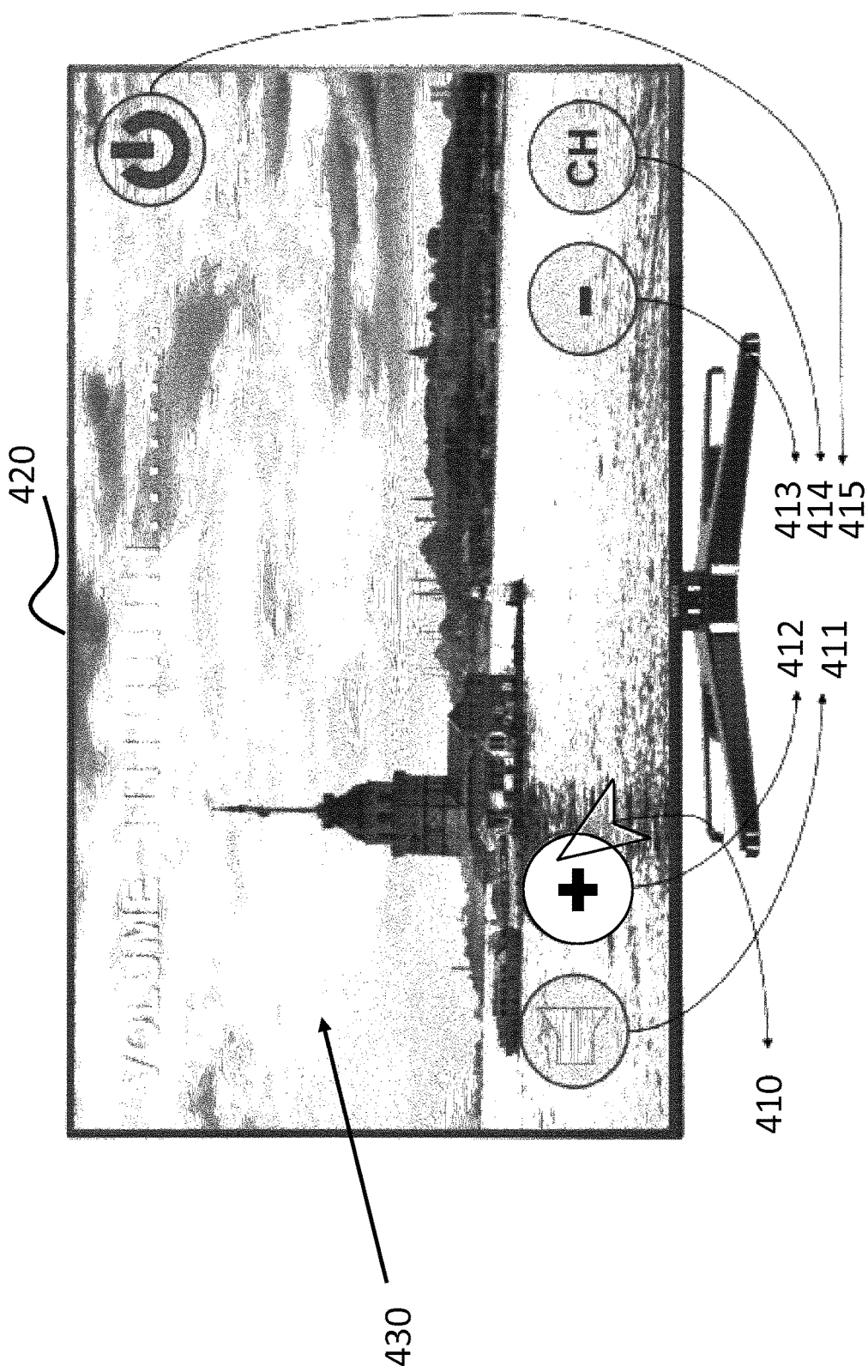
FIG. 4 shows schematically an example of a user interface with a plurality of graphical elements/icons according to the present disclosure.

FIG. 4 shows schematically an example of a user interface (UI) with a plurality of graphical elements/icons 411-415 according to the present disclosure. Thanks to gestures or motions (i.e., pitch- and/or yaw- and/or roll-based rotations leading to changes in the orientation of the 3D head pose) of the head, the user may remotely locate a cursor 410 (depicted as an arrow) over one of graphical elements 411-415 (depicted as buttons) on a display screen 430 of a computing device 420 (depicted as a TV set), and a selection operation may then occur by holding in position or dwelling the cursor 410 during a predetermined duration of time (e.g., 500 milliseconds) or by performing a specific gesture. The selected graphical element 411-415 may be highlighted in response to the selection operation in order to better visualise it. In the example of FIG. 4, the head gesture of the user selects the graphical element 412 allowing to increase the sound volume by pointing the cursor 410 at this element 412 and holding in position the cursor 410 during a predetermined duration of time.

In summary, the present disclosure is related to a human-computer interaction procedure, which enables a user to use his/her head for remotely controlling a computing device having a display screen. This remote control of the computing device employs one or more image capturing devices (e.g., one or more cameras) which continuously acquire the face image of the user. The acquired images are then directed towards the computing device to be processed by a processor or a computation unit using computer vision algorithms. Afterwards, the 3D pose of the user's head is specified in terms of orientation (3×3 rotation matrix) and position (3×1 translation vector) and estimated with the aim of constructing a real-time mapping between the estimated 3D head pose in the egocentric coordinate system and a cursor in the coordinate system of a 2D plane of the display screen of the computing device. Through subtle head motions or gestures (in particular, pitch- and yaw-based rotations leading to changes in the orientation of the estimated 3D head pose), the user can reach any location on the display screen and select any graphical element of a user interface by dwelling the cursor as mapped in real time to the estimated 3D head pose. The proposed interaction procedure can be utilized in many real-life applications such as TV sets and digital signage screens. For example, a passenger in an airport can interact with a digital information screen to find out the gate number or boarding time of his/her flight just by subtle motions or gestures of his/her head in a contactless and calibration-free manner without using the hands.

It will be understood that the integrated circuit or processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium such as a solid-state drive (SSD) or other semiconductor-based read access memory (RAM), a read only memory (ROM) such as a compact disc (CD) ROM or a semiconductor ROM, a magnetic recording medium such as a floppy disk or a hard disk, optical memory devices in general and so on.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. A method for remotely controlling a computing device, the method comprising:
repeatedly capturing an image from a video frame;
detecting a human face in the captured image;
matching the detected human face to a previously detected human face;
extracting facial landmarks from the matched detected human face;
estimating a 3D head pose of the matched detected human face based on the extracted facial landmarks, the 3D head pose being represented in an egocentric coordinate system by a 3D pose vector which is directed from the human face, the 3D pose vector being free to rotate around x-, y- and z-axes of the egocentric coordinate system using respective rotation matrices and free to translate along the x-, y- and z-axes of the egocentric coordinate system using a translation vector; and controlling a user interface on a display screen of the computing device according to the estimated 3D head pose;

wherein controlling the user interface on the display screen of the computing device comprises mapping a cursor on the display screen of the computing device to the estimated 3D head pose;

wherein mapping the cursor on the display screen of the computing device to the estimated 3D head pose comprises converting the 3D pose vector in the egocentric coordinate system to a 2D pose vector in a coordinate system of a 2D plane of the display screen;

wherein converting the 3D pose vector in the egocentric coordinate system to a 2D pose vector in a coordinate system of the 2D plane of the display screen comprises projecting the 3D head pose vector axes of the egocentric coordinate system onto the 2D lane of the display screen and applying a 3D-to-2D mapping function that utilizes rotation-based information, and wherein the coordinates ($x_{screen}$, $y_{screen}$) of the 2D pose vector in the coordinate system of the display screen are expressed in pixels and are given, after applying the 3D-to-2D mapping function, by:

$$x_{screen}(\text{pixel}) = \frac{W}{2} + \left(\frac{x_z - x_0}{|x_x - x_0|} \times \frac{W \times f_x}{2}\right);$$

$$y_{screen}(\text{pixel}) = \frac{H}{2} + \left(\frac{y_z - y_0}{|y_y - y_0|} \times \frac{H \times f_y}{2}\right),$$

where:
W denotes the width (in pixels) of the display screen;
H denotes the height (in pixels) of the display screen;
$f_x$ denotes a replacement factor along the x-axis of the coordinate system of the display screen;
$f_y$ denotes a replacement factor along the v-axis of the coordinate system of the display screen;
($x_0$, $y_0$) denotes the coordinates of the origin in the coordinate system of the display screen after converting the coordinates of the origin of the egocentric coordinate system;
($x_z$, $y_z$) denotes the coordinates of the z-axis component of the 2D pose vector in the coordinate system of the display screen after converting the z-axis component of the 3D pose vector in the egocentric coordinate system;
$x_x$ denotes the abscissa of the x-axis component of the 2D pose vector in the coordinate system of the display screen after converting the x-axis component of the 3D pose vector in the egocentric coordinate system, and
$y_y$ denotes the ordinate of the y-axis component of the 2D pose vector in the coordinate system of the display screen after converting the y-axis component of the 3D pose vector in the egocentric coordinate system.

2. The method of claim 1, wherein the rotation-based information is orientation information about pitch and yaw angles.

3. The method of claim 1, wherein the extracted facial landmarks are used as a match to a generic 3D face model.

4. The method of claim 1, wherein the image is repeatedly captured from the video frame using at least one image capturing device.

5. An interactive system comprising:
at least one image capturing device arranged to repeatedly capture an image from a video frame; and
a computing device comprising:
a display screen; and
a processor arranged to:
detect a human face in the captured image;
match the detected human face to a previously detected human face;
extract facial landmarks from the matched detected human face;
estimate a 3D head pose of the matched detected human face based on the extracted facial landmarks, the 3D head pose being represented in an egocentric coordinate system by a 3D pose vector which is directed from the human face, the 3D pose vector being free to rotate around x-, y- and z-axes of the egocentric coordinate system using respective rotation matrices and free to translate along the x-, y- and z-axes of the egocentric coordinate system using a translation vector; and
control a user interface on a display screen of the computing device according to the estimated 3D head pose;

wherein the processor is arranged to control the user interface on the display screen of the computing device by mapping a cursor on the display screen of the computing device to the estimated 3D head pose;

wherein mapping the cursor on the display screen of the computing device to the estimated 3D head pose comprises converting the 3D pose vector in the egocentric coordinate system to a 2D pose vector in a coordinate system of a 2D plane of the display screen;

wherein converting the 3D pose vector in the egocentric coordinate system to a 2D pose vector in a coordinate system of the 2D plane of the display screen comprises projecting the 3D head pose vector axes of the egocentric coordinate system onto the 2D plane of the display screen and applying a 3D-to-2D mapping function that utilizes rotation-based information; and wherein the coordinates ($x_{screen}$, $y_{screen}$) of the 2D pose vector in the coordinate system of the display screen are expressed in pixels and are given, after applying the 3D-to-2D mapping function, by:

$$x_{screen}(\text{pixel}) = \frac{W}{2} + \left(\frac{x_z - x_0}{|x_x - x_0|} \times \frac{W \times f_x}{2}\right);$$

$$y_{screen}(\text{pixel}) = \frac{H}{2} + \left(\frac{y_z - y_0}{|y_y - y_0|} \times \frac{H \times f_y}{2}\right),$$

where:
W denotes the width (in pixels) of the display screen;
H denotes the height (in pixels) of the display screen;
$f_x$ denotes a replacement factor along the x-axis of the coordinate system of the display screen;
$f_y$ denotes a replacement factor along the v-axis of the coordinate system of the display screen;
($x_0$, $y_0$) denotes the coordinates of the origin in the coordinate system of the display screen after converting the coordinates of the origin of the egocentric coordinate system;

($x_z$, $y_z$) denotes the coordinates of the z-axis component of the 2D pose vector in the coordinate system of the display screen after converting the z-axis component of the 3D pose vector in the egocentric coordinate system;

$x_x$ denotes the abscissa of the x-axis component of the 2D pose vector in the coordinate system of the display screen after converting the x-axis component of the 3D pose vector in the egocentric coordinate system, and $y_y$ denotes the ordinate of the y-axis component of the 2D pose vector in the coordinate system of the display screen after converting the y-axis component of the 3D pose vector in the egocentric coordinate system.

6. The interactive system of claim 5, wherein the computing device comprises a storage unit arranged to store the matched detected human face.

7. The interactive system of claim 5, wherein the at least one image capturing device is embodied in the computing device.

8. The interactive system of claim 5, arranged such that the cursor is free to move on the display screen.

9. A storage medium storing a non-transitory computer program, the computer program comprising program instructions arranged such that, when the computer program is executed on a device, the program instructions cause the device to carry out a method according to claim 1.

\* \* \* \* \*